United States Patent [19]
Lazara et al.

[11] Patent Number: 6,091,357
[45] Date of Patent: Jul. 18, 2000

[54] COMMUNICATION SYSTEM AND METHOD FOR DETERMINING A RELIABILITY OF A SIGNAL

[75] Inventors: Dominic Lazara, Chicago; Jeffrey J. Blanchette, Palatine; Frank W. Korinek, Carol Stream; Timothy J. Groch, Palatine, all of Ill.

[73] Assignee: Motorola, Inc., Schaumburg, Ill.

[21] Appl. No.: 09/221,058

[22] Filed: Dec. 28, 1998

[51] Int. Cl.[7] ............................... G01S 5/02; H04B 7/185
[52] U.S. Cl. ..................... 342/357.03; 342/357.1
[58] Field of Search ......................... 342/357.06, 357.03, 342/357.09, 357.1

[56] References Cited

U.S. PATENT DOCUMENTS 5,436,632  7/1995  Sheynblat ........................... 342/357.03

OTHER PUBLICATIONS

Geier, King, Kennedy, Thomas, and McNamara, "Prediction Of The Time Accuracy And Integrity OF GPS Timing", 1995 IEEE Frequency & Control Symposium.

Primary Examiner—Thomas H. Tarcza
Assistant Examiner—Fred H. Mull
Attorney, Agent, or Firm—Jeffrey K. Jacobs

[57] ABSTRACT

The present invention addresses the need for an apparatus and method of determining the reliability of a first signal (e.g., 116) received by a given base site (e.g., 126) without requiring the reception of additional signals (e.g., 110 and 112) by the given base site (126). The present invention provides both a method and apparatus in which another base site (e.g., 122) receives the additional signals (110 and 112) required to determine the reliability of the first signal (116). Upon determining that the first signal (116) is unreliable, the other base site (122) notifies the given base site (126) that the first signal (116) is unreliable.

20 Claims, 2 Drawing Sheets

COMMUNICATION SYSTEM AND METHOD FOR DETERMINING A RELIABILITY OF A SIGNAL

FIELD OF THE INVENTION

The present invention relates generally to communication systems and, in particular, to determining a reliability of a signal received by a communication system.

BACKGROUND OF THE INVENTION

Today, Global Positioning System (GPS) satellites are used by land based communication systems for synchronization between base sites. Such synchronization requires the reception of at least one GPS satellite signal by each base site within the communication system. However, simply receiving a single GPS satellite signal is not enough to ensure that the base site is synchronized, since the GPS satellite signal received may be unreliable.

In order to ensure reliability of a GPS satellite signal used for synchronization, GPS Real-time Autonomous Integrity Monitor (RAIM) is used. RAIM, as described in the IEEE article "Prediction of the Time Accuracy and Integrity of GPS Timing", requires that two or more GPS satellite signals be simultaneously received, however. This requirement is a significant constraint when choosing a location for a base site. For example, locations with nearby man-made structures or local geographical features that prevent a base site from simultaneously receiving the two or more GPS satellites cannot be chosen.

Although a single GPS signal may be used to synchronize communications, in order to insure that the single GPS signal is itself reliable, base sites must be located where at least three GPS signals can be received. There is a need, therefore, for an apparatus and method for determining the reliability of a single GPS signal at a base site without requiring the reception of additional GPS signals by the base site.

DESCRIPTION OF A PREFERRED EMBODIMENT

The present invention addresses the need for an apparatus and method of determining the reliability of a first signal received by a given base site without requiring the reception of additional signals by the given base site. The present invention provides both a method and apparatus in which another base site receives the additional signals required to determine the reliability of the first signal. Upon determining that the first signal is unreliable, the other base site notifies the given base site that the first signal is unreliable.

The present invention encompasses the following method for a communication system to determine a reliability of a signal. A first base site and a second base site receive a first signal. Based on a time reference indicated by the first signal, the second base site synchronizes the transmission and reception of communication signals. In addition to the first signal, the first base site also receives a group of one or more signals, a second and third signal for example. The first base site determines whether the first signal is reliable using the first signal and the group signals. When the first signal is unreliable, the second base site is notified that the first signal is unreliable. In response to being notified that the first signal is unreliable, the second base site ceases to synchronize the transmission and reception of communication signals based on the time reference indicated by the first signal.

Additionally, the present invention encompasses the following apparatus for determining a reliability of a signal. The apparatus is a communication system comprising multiple base sites. A first base site of the multiple base sites receives a first signal from a first satellite and one or more signals, in addition to the first signal, from one or more satellites. Using the first signal and the one or more signals, the first base site determines whether the first signal is reliable. When the first signal is determined to be unreliable, the first base site generates a notification that the first signal is unreliable, and a second base site of the multiple base sites, which is also receiving the first signal from the first satellite, receives notification that the first signal is unreliable.

Figure 1:
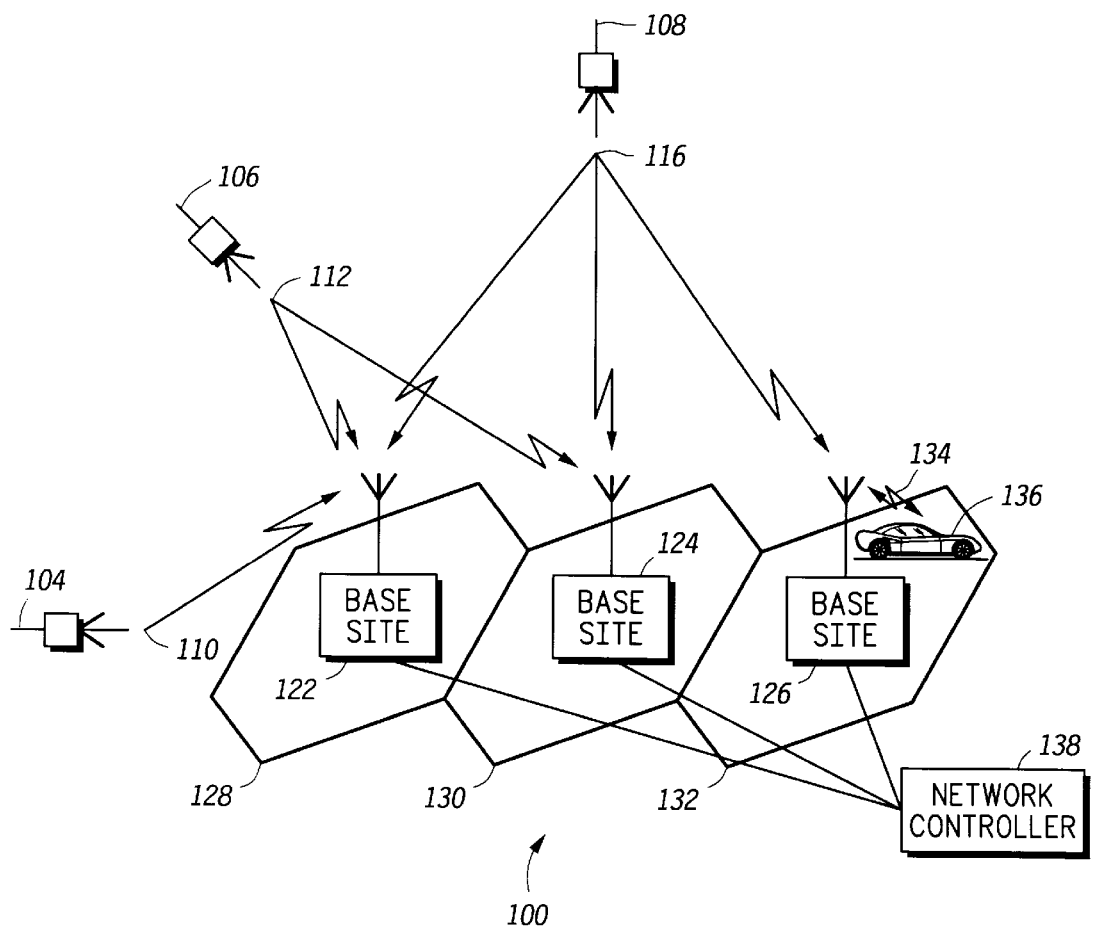
FIG. 1 is a block diagram depiction of a communication system in accordance with a preferred embodiment of the present invention.
Figure 2:
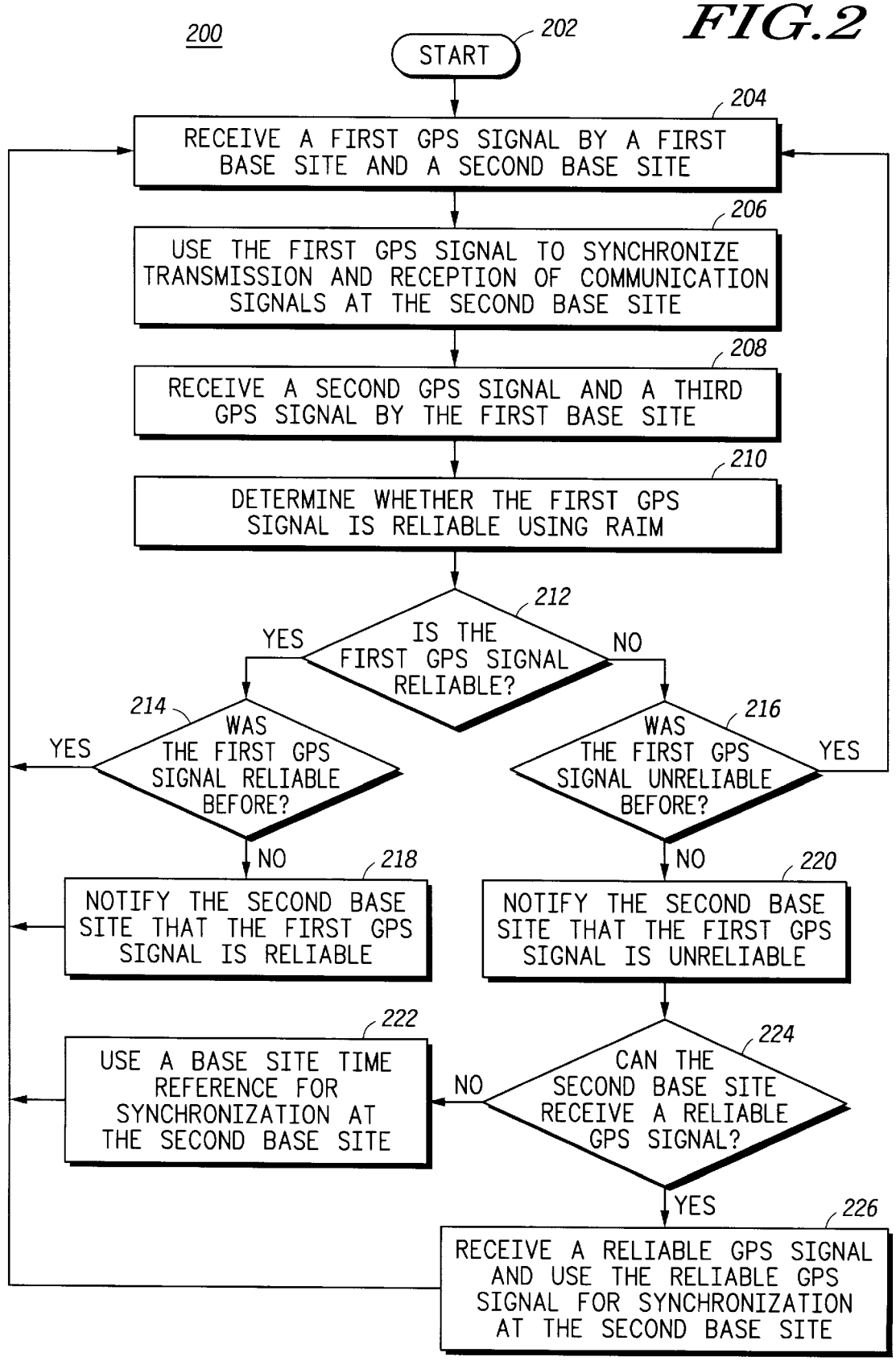
FIG. 2 is a logic flow diagram of steps executed by a communication system in accordance with the preferred embodiment of the present invention.

The present invention can be more fully understood with reference to FIGS. 1–2. FIG. 1 is a block diagram depiction of a communication system in accordance with a preferred embodiment of the present invention. Communication system 100 comprises a plurality of base sites 122, 124, and 126 and a network controller 138. Service coverage areas 128, 130, and 132 are the geographical areas throughout which base sites 122, 124, and 126 can provide communication service, respectively, to mobile units such as mobile unit 136. Although only three base sites are shown, it is clearly understood that a communication system in accordance with the present invention may comprise two or more base sites.

Preferably, communication system 100 comprises an "iDEN" communication system, all components of which are commercially available from "MOTOROLA", Inc. of Schaumburg, Ill. Base sites 122, 124, and 126 are preferably "iDEN" Enhanced Base Transceiver System (EBTS) sites, and network controller 138 is preferably an "iDEN" Operations Management Center (OMC). Accordingly, mobile unit 136 preferably comprises an "iDEN" wireless phone.

Operation of preferred communication system 100 occurs, in accordance with the present invention, substantially as follows. GPS satellites 104, 106, and 108, in orbit about the Earth, transmit GPS signals 110, 112, and 116, respectively. Base site 126 receives GPS signal 116, the first signal, and preferably uses GPS signal 116 to synchronize the transmission and reception of communication signals 134, which are exchanged between base site 126 and mobile unit 136. Base site 122 also receives GPS signal 116 and further receives a second signal, GPS signal 112, and a third signal, GPS signal 110. Using the first signal, the second signal, the third signal, and RAIM, base site 122 determines whether the first signal, GPS signal 116, is reliable.

Preferably base site 122 has a list of GPS signals that indicates whether each signal was last determined to be reliable or not. When GPS signal 116 is determined to be unreliable and the list indicates that GPS signal 116 was last determined to be reliable, base site 122 generates a notification that GPS signal 116 is unreliable. Network controller 138 receives the notification generated by base site 122 that the first signal is unreliable, and notifies the base sites of communication system 100 that the first signal is unreliable.

Network controller 138 preferably maintains a list of GPS signals 110, 112, and 116 indicating whether each signal on the list is reliable or unreliable. Upon receiving notifications from base sites 128, 130, and 132 indicating the reliability of particular GPS signals, network controller 138 updates the list and notifies the base sites of communication system 100 using the list.

When GPS signal 116 is instead determined to be reliable and the list of base site 122 indicates that the GPS signal was last determined to be unreliable, base site 122 generates a notification that GPS signal 116 is reliable. Network controller 138 receives the notification generated by base site 122 that the first signal is reliable, updates the list network controller 138 maintains and notifies the base sites of communication system 100 that GPS signal 116 is reliable using the updated list.

Since base site 126 is using GPS signal 116 to synchronize the transmission and reception of communication signals 134, when base site 126 is notified that GPS signal 116 is unreliable, base site 126 preferably switches the synchronization of communication signals 134 to an internal time reference. Base site 126 preferably switches to an internal time reference, since it can no longer receive a reliable GPS signal.

Base site 124, however, is receiving both GPS signal 116 and GPS signal 112 and using both signals to synchronize the transmission and reception of communication signals 134. When base site 124 is notified that GPS signal 116 is unreliable, base site 124 preferably ceases to use GPS signal 116 for the synchronization. Since base site 124 continues to receive GPS signal 112, a reliable GPS signal, base site 124 preferably continues to use GPS signal 112 for synchronization rather than switching to an internal time reference.

By determining the reliability of a signal in this manner, the present invention allows a base site to receive a single signal for synchronization. Another base site, networked to this base site, receives the additional required signals, determines whether the single signal is reliable or not, and notifies the base site regarding the reliability of the single signal. Prior to the present invention, all base sites needed to receive multiple signals in order to determine the reliability of the signal used for synchronization. With the present invention, base sites can be placed in locations where a signal required for synchronization can be received but not necessarily the additional signals required for determining reliability.

FIG. 2 is a logic flow diagram of steps executed by a communication system in accordance with the preferred embodiment of the present invention. The logic flow begins (202) when a first base site and a second base site receive (204) a first signal. Preferably, the first signal is a GPS satellite signal from a first GPS satellite. In the preferred embodiment, the second base site then synchronizes (206) the transmission and reception of communication signals based on a time reference indicated by the first signal. The synchronization of communication signals based on a time reference is performed by techniques well known to those skilled in the art.

The first base site further receives (208) a group of one or more signals in addition to the first signal. Preferably, the first base site receives a second GPS satellite signal from a second GPS satellite and a third GPS satellite signal from a third GPS satellite. Using the first signal and the group of signals, the first base site determines (210) whether the first signal is reliable. In the preferred embodiment, the first base site determines whether the first signal is reliable using RAIM.

If (212) the first GPS satellite signal is determined to be reliable, the first base site preferably determines (214) whether the first GPS satellite signal was considered reliable after the last determination. In the preferred embodiment, the first base site has a list of GPS satellite signals that indicates whether each GPS satellite signal was last determined to be reliable or not. If the first base site's list indicates that the first GPS satellite signal was reliable, then the logic flow returns to step 204. Otherwise, since the first base site's list indicates that the first GPS satellite signal was not reliable last time, the first base site notifies (218) the second base site that the first GPS satellite signal is reliable. Preferably, the second base site can then begin using the first GPS satellite signal for synchronization.

Instead, if the first GPS satellite signal is determined to be unreliable using RAIM, the first base site preferably determines (216) whether the first GPS satellite signal was considered unreliable after the last determination. If the first base site's list indicates that the first GPS satellite signal was unreliable, then the logic flow returns to step 204. Otherwise, since the first base site's list indicates that the first GPS satellite signal was not unreliable last time, the first base site notifies (220) the second base site that the first GPS satellite signal is unreliable.

In response to being notified that the first GPS satellite signal is unreliable, the second base site ceases synchronizing the transmission and reception of communication signals based on the time reference indicated by the first GPS satellite signal. In the preferred embodiment, the second base site determines (224) whether a reliable GPS satellite signal can be received. Like the first base site, the second base site preferably has a list of GPS satellite signals that indicates which GPS satellite signals are reliable.

If the second base site is able to receive a reliable GPS satellite signal, the second base site synchronizes (226) the transmission and reception of communication signals based on the time reference indicated by the reliable GPS satellite signal. Otherwise, the second base site synchronizes (222) the transmission and reception of communication signals based on a base site time reference. In both cases, the logic flow returns to step 204 as the present method is used repeatedly to determine the reliability of GPS satellite signals in the preferred embodiment.

The descriptions of the invention, the specific details, and the drawings mentioned above, are not meant to limit the scope of the present invention. For example, RAIM requires three or more GPS signals to ensure the reliability of a particular signal, but other signal verification techniques instead of or in addition to RAIM could be used requiring only two or more signals. Since RAIM can determine that one of two received signals is potentially unreliable more sophisticated techniques could be used to determine which of the two signals is actually unreliable. Additionally, the received signals are used for synchronizing communications in the preferred embodiment; however, the present invention applies to a signal received for any purpose and that requires additional signals to verify reliability. It is the intent of the inventors that various modifications can be made to the present invention without varying from the spirit and scope of the invention, and it is intended that all such modifications come within the scope of the following claims and their equivalents.

What is claimed is:

1. A method for a communication system to determine a reliability of a signal, the method comprising the steps of:

receiving a first signal by a first base site and a second base site;

receiving a group of at least one signal by the first base site in addition to the first signal;

determining whether the first signal is reliable using the first signal and the group of at least one signal; and when the first signal is unreliable, notifying the second base site that the first signal is unreliable.

2. The method of claim 1, wherein the first signal and the group of at least one signal comprise satellite signals.

3. The method of claim 2, wherein the satellite signals comprise Global Positioning System (GPS) satellite signals.

4. The method of claim 3, wherein the step of receiving a first signal comprises the step of receiving, by the first base site and the second base site, a first GPS satellite signal from a first GPS satellite, and wherein the step of receiving a group of at least one signal comprises the step of receiving, by the first base site, a second GPS satellite signal from a second GPS satellite.

5. The method of claim 4, wherein the step of determining whether the first signal is reliable comprises the step of determining whether the first signal is reliable using Real-time Autonomous Integrity Monitor.

6. The method of claim 1, further comprising, subsequent to the step of receiving the first signal, the step of synchronizing, by the second base site, a transmission and reception of communication signals, based on a time reference indicated by the first signal.

7. The method of claim 6, further comprising the step of synchronizing by the second base site, when notified that the first signal is unreliable, the transmission and reception of communication signals based on a base site time reference.

8. The method of claim 6, further comprising the steps of:

when notified that the first signal is unreliable, receiving, by the second base site, a reliable GPS satellite signal; and synchronizing, by the second base site, the transmission and reception of communication signals based on a time reference indicated by the reliable GPS satellite signal.

9. The method of claim 1, further comprising the step of notifying, when the first signal is reliable, the second base site that the first signal is reliable.

10. A method for a communication system to determine a reliability of a signal, the method comprising the steps of:

receiving a first signal by a first base site and a second base site;

synchronizing, by the second base site, a transmission and reception of communication signals, based on a time reference indicated by the first signal;

receiving a second signal and a third signal by the first base site;

determining whether the first signal is reliable using the first signal, the second signal, and the third signal;

when the first signal is unreliable, notifying the second base site that the first signal is unreliable; and ceasing to synchronize, by the second base site, the transmission and reception of communication signals based on the time reference indicated by the first signal, in response to being notified that the first signal is unreliable.

11. A communication system comprising:

a first base site of a plurality of base sites that receives a first signal of a plurality of signals from a first satellite of a plurality of satellites and a group of at least one signal of the plurality of signals, in addition to the first signal, from a group of at least one satellite of the plurality of satellites, that determines whether the first signal is reliable using the first signal and the group of at least one signal, and that generates a notification that the first signal is unreliable, when the first signal is determined to be unreliable; and a second base site of the plurality of base sites, coupled to the first base site, that receives the first signal from the first satellite and receives a notification that the first signal is unreliable, when the first base site determines that the first signal is unreliable.

12. The communication system of claim 11 wherein the plurality of satellites comprises a plurality of Global Positioning System satellites.

13. The communication system of claim 11 wherein the group of at least one signal comprises a second signal and wherein the first base site determines whether the first signal is reliable using the first signal, the second signal, and Real-time Autonomous Integrity Monitor.

14. The communication system of claim 11 further comprising a network controller that receives the notification generated by the first base site that the first signal is unreliable, and notifies the plurality of base sites that the first signal is unreliable.

15. The communication system of claim 14 wherein the network controller further maintains a list of the plurality of signals indicating whether each signal on the list is unreliable.

16. The communication system of claim 15 wherein the network controller further notifies the plurality of base sites that the first signal is unreliable using the list.

17. The communication system of claim 11 wherein the first base site generates a notification that the first signal is reliable, when the first signal is determined to be reliable.

18. The communication system of claim 17 further comprising a network controller that receives the notification generated by the first base site that the first signal is reliable, and notifies the plurality of base sites that the first signal is reliable.

19. The communication system of claim 18 wherein the network controller further maintains a list of the plurality of signals indicating whether each signal on the list is reliable.

20. The communication system of claim 19 wherein the network controller further notifies the plurality of base sites that the first signal is reliable using the list.

* * * * *

UNITED STATES PATENT AND TRADEMARK OFFICE
CERTIFICATE OF CORRECTION

PATENT NO. : 6,091,357

DATED : 7/18/2000

INVENTOR(S) : Lazara et al.

It is certified that error appears in the above-identified patent and that said Letters Patent is hereby corrected as shown below:

Column 1, line 21, "real-time" should read --receiver--

Column 5, line 18-19, "real-time" should read --receiver--.

Signed and Sealed this

Twenty-sixth Day of September, 2000

Attest:

Q. TODD DICKINSON

*Attesting Officer*  *Director of Patents and Trademarks*